US010630072B2

(12) United States Patent
Ravinuthula et al.

(10) Patent No.: US 10,630,072 B2
(45) Date of Patent: Apr. 21, 2020

(54) VOLTAGE PROTECTION CIRCUIT

(71) Applicant: TEXAS INSTRUMENTS INCORPORATED, Dallas, TX (US)

(72) Inventors: Vishnu Ravinuthula, Allen, TX (US); Simon Bevan Churchill, Whitchurch (GB); Mark Allen Hamlett, Richardson, TX (US); Eric Rudeen, Denver, CO (US)

(73) Assignee: Texas Instruments Incorporated, Dallas, TX (US)

( * ) Notice: Subject to any disclaimer, the term of this patent is extended or adjusted under 35 U.S.C. 154(b) by 293 days.

(21) Appl. No.: 15/856,457

(22) Filed: Dec. 28, 2017

(65) Prior Publication Data
US 2019/0207384 A1    Jul. 4, 2019

(51) Int. Cl.
| | |
|---|---|
| H02H 9/04 | (2006.01) |
| H04B 17/345 | (2015.01) |
| H02H 1/00 | (2006.01) |
| H04B 3/30 | (2006.01) |
| H04B 1/40 | (2015.01) |

(52) U.S. Cl.
CPC ............ *H02H 9/04* (2013.01); *H02H 1/0007* (2013.01); *H04B 3/30* (2013.01); *H04B 17/345* (2015.01); *H04B 1/40* (2013.01)

(58) Field of Classification Search
CPC .......... H02H 1/0007; H02H 9/04; H04B 1/40; H04B 3/00; H04B 17/345
USPC .......................................................... 361/86
See application file for complete search history.

(56) References Cited

U.S. PATENT DOCUMENTS

| | | | | |
|---|---|---|---|---|
| 5,479,114 A | * | 12/1995 | Miura | H03K 19/09425 |
| | | | | 326/60 |
| 9,240,400 B2 | * | 1/2016 | P | H01L 27/0248 |
| 2007/0139024 A1 | | 6/2007 | Zolfaghari | |
| 2011/0051303 A1 | * | 3/2011 | Migliavacca | H02J 7/0031 |
| | | | | 361/91.5 |
| 2013/0119955 A1 | | 5/2013 | Williams et al. | |

FOREIGN PATENT DOCUMENTS

WO    2009114016 A1    9/2009

OTHER PUBLICATIONS

Search Report for PCT Application No. PCT/US18/65260, 1 page.

* cited by examiner

*Primary Examiner* — Kevin J Comber
(74) *Attorney, Agent, or Firm* — Tuenlap Chan; Charles A. Brill; Frank D. Cimino

(57) ABSTRACT

A voltage protection circuit, comprising a first metal oxide semiconductor field effect transistor (MOSFET) having a gate terminal coupled to a first node, a source terminal coupled to a second node, and a drain terminal coupled to a third node, a second MOSFET having a gate terminal coupled to the first node, a source terminal coupled to the second node, and a drain terminal coupled to a fourth node, a first current mirror coupled to the third node and configured to couple to a fifth node, a sixth node, and a regulator supply, and a second current mirror coupled to the fourth node, and configured to couple to the fifth node, the sixth node, and a ground node.

20 Claims, 4 Drawing Sheets

VOLTAGE PROTECTION CIRCUIT

SUMMARY

According to aspects of the disclosure, a voltage protection circuit, comprising a first metal oxide semiconductor field effect transistor (MOSFET) having a gate terminal coupled to a first node, a source terminal coupled to a second node, and a drain terminal coupled to a third node, a second MOSFET having a gate terminal coupled to the first node, a source terminal coupled to the second node, and a drain terminal coupled to a fourth node, a first current mirror coupled to the third node and configured to couple to a fifth node, a sixth node, and a regulator supply, and a second current mirror coupled to the fourth node, and configured to couple to the fifth node, the sixth node, and a ground node.

In other aspects of the disclosure, a transceiver comprising a transmitter coupled to a first node and a second node and a receiver coupled to the first node and the second node. The receiver comprises a voltage protection circuit that comprises a first MOSFET having a gate terminal coupled to a third node, a source terminal coupled to a fourth node, and a drain terminal coupled to a fifth node, a second MOSFET having a gate terminal coupled to the third node, a source terminal coupled to the fourth node, and a drain terminal coupled to a sixth node, a first current mirror coupled to the fifth node, a seventh node, an eighth node, and configured to couple to a regulator supply, and a second current mirror coupled to the sixth node, the seventh node, the eighth node, and configured to couple to a ground node.

In other aspects of the disclosure, a method of voltage protection, comprising receiving a signal including a common-mode voltage significantly varying from a reference voltage, providing the common-mode voltage to a source terminal of a MOSFET and providing the reference voltage to a gate terminal of the MOSFET, conducting current between the source terminal and a drain terminal of the MOSFET to turn on a current mirror when a difference between a value of the common-mode voltage and a value of the reference voltage exceeds a threshold, pulling the value of the common-mode voltage toward the value of the reference voltage using the current mirror, and ceasing conducting current between the source terminal and a drain terminal of the MOSFET when the common-mode voltage no longer significantly varies from the reference voltage.

BRIEF DESCRIPTION OF THE DRAWINGS

For a detailed description of various examples, reference will now be made to the accompanying drawings in which.

DETAILED DESCRIPTION

Figure 1:
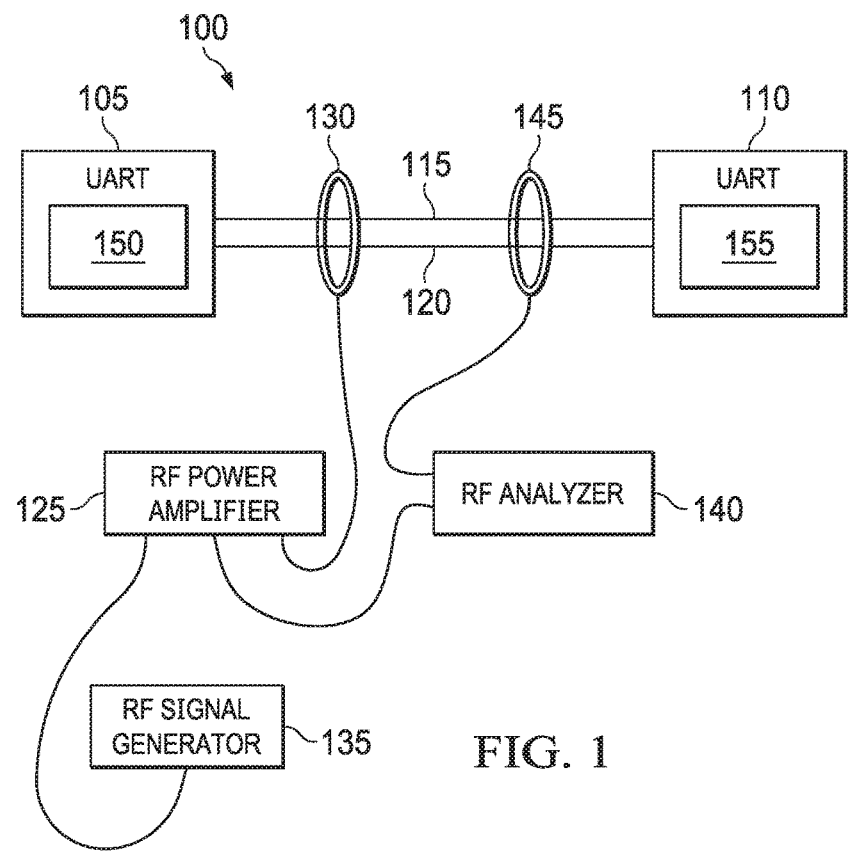
FIG. 1 shows a block diagram of an illustrative electrical device testing environment.

An electrical device may undergo tests during its lifetime, for example, during manufacturing of the electrical device, after manufacturing but before the electrical device is released for use, and/or after the electrical device has been released for use. The tests may take various forms, but in one example may include a bulk current injection (BCI) test. The BCI test, for example, may test an immunity of components of the electrical device to radio frequency (RF) interference. At least some of the tests, such as the BCI test, may introduce comparatively large voltages and/or currents into the electrical device. For example, in the BCI test a current is injected to a communication line via a clamp ring electromagnetically coupled to the communication line. In at least some examples, this current causes a corresponding common-mode voltage present on the communication line to increase. For example, the common-mode voltage may be at least +/−20 volts (V), at least +/−40 V, or greater. In at least some examples, such common-mode voltages may impair reliability and/or operation of the electrical device. For example, the common-mode voltage may be outside of a range of acceptable voltages for one or more components of the electrical device and may cause irreversible damage to at least some of the components and/or cause at least some of the components to render an inaccurate output. To at least partially mitigate the increase in common-mode voltage, one or more chokes may be placed at a connection point (e.g., an input and/or output pin) of the electrical device to protect the electrical device. The choke may be, for example, a common-mode choke in which neutral and line wires are wrapped around a core material (which may be magnetic). However, such chokes may increase a cost of the electrical device.

At least some aspects of the present disclosure provide for a common-mode voltage protection circuit that at least partially mitigates the expense associated with compensating for the common-mode voltage by protecting against the common-mode voltage in a circuit implementation. In at least one example, the common-mode voltage protection circuit is implemented in a receiver, a transmitter, or a transceiver including both receiver and transmitter functionality. In at least one example, the common-mode voltage protection circuit is implemented in a universal asynchronous receiver-transmitter (UART), for example, a full-duplex UART. In other examples, the common-mode voltage protection circuit may be implanted as a standalone device or as a component of any other electrical device that receives a common-mode voltage. In at least one example, the common-mode voltage protection circuit compares the common mode input voltage to a reference voltage and sources current into, or sinks current from, the common mode input until the common mode input voltage is approximately the reference voltage. In some examples, the reference voltage is approximately mid-rail (e.g., approximately midway between a first voltage potential such as a source voltage and a second voltage potential such as ground or another non-ground voltage potential) in an electrical device that includes the common-mode voltage protection circuit. In another example, the common-mode voltage protection circuit blocks current from flowing out of ground into a terminal of the electrical device and/or into a regulator supply of the electrical device from the terminal of the electrical device.

Referring now to FIG. 1, a block diagram of an illustrative electrical device testing environment 100 is shown. In at least one example, the environment includes a UART 105 coupled to a UART 110 via communication lines 115 and 120, a RF Power Amplifier 125 electromagnetically coupled to the communication lines 115 and 120 via an injection clamp 130, a RF Signal Generator 135 coupled to the RF Power Amplifier 125, a RF Analyzer 140 coupled to the RF Power Amplifier 125 and electromagnetically coupled to the communication lines 115 and 120 via a measuring clamp 145. In at least one example, the UART 105 and the UART 110 include a common-mode voltage protection circuit 150 and 155, respectively. In at least some examples, the UART 105 and the UART 110 may be full-duplex devices that are substantial duplicates of one another. In at least some examples, the UART 105 and the UART 110 each include a transmitter (not shown) and a receiver (not shown), each of which may include its own respective common-mode voltage protection and/or common-mode voltage protection circuit 150 or 155. While illustrated in FIG. 1 as a UART 105 and a UART 110, both the UART 105 and the UART 110 may be replaced by any other suitable electrical device.

In operation, the UART 105 and the UART 110 may be in communication via the communication lines 115 and 120. For example, the communication line 115 may be a positive communication line (p) and the communication line 120 may be a negative communication line (n). In at least one example, a transmitter of the UART 105 is active and transmitting data to a receiver of the UART 110. In this example, the UART 110 may be the device under test (DUT) in the environment 100, for example, such that a BCI test of the UART 110 is being performed. For example, to perform the test, the RF Signal Generator 135 generates a signal (e.g., a sinusoidal signal) having a frequency within a predefined range (e.g., 1-400 megahertz (MHz)) and provides the generated signal to the RF Power Amplifier 125. The RF Power Amplifier 125 may amplify the generated signal to have a pre-defined amplitude and injects the amplified signal onto the communication lines 115 and 120 via the injection clamp 130. In at least one example, the RF Analyzer 140 measures signals present on the communication lines 115 and 120 via the measuring clamp 145 and provides the measurement to the RF Power Amplifier 125 as feedback.

As discussed above, in some examples the RF signal injected onto the communication lines 115 and 120 via the injection clamp 130 increases a common mode voltage of the signals present on the communication lines 115 and 120 and this common mode voltage may exceed acceptable ranges for at least some components of the UART 105 and/or the UART 110. In at least some examples, the common-mode voltage protection circuit 150 protects the UART 105 (e.g., a transmitter of the UART 105) and/or the common-mode voltage protection circuit 155 protects the UART 110 (e.g., a receiver of the UART 110) from the common mode voltage present on the communication lines 115 and 120. For example, the common-mode voltage protection circuit 150 may protect the UART 105 by blocking current from flowing out of ground into the communication lines 115 or 120 and/or into a regulator supply (not shown) of the UART 105 from the communication lines 115 and 120. In at least one example the common-mode voltage protection circuit 155 may protect the UART 110 by sourcing current into, or sinking current from, the communication lines 115 and 120 until the common mode input voltage present on the communication lines 115 and 120 is approximately equal to a reference voltage (e.g., a mid-rail value) present in the UART 110.

Figure 2:
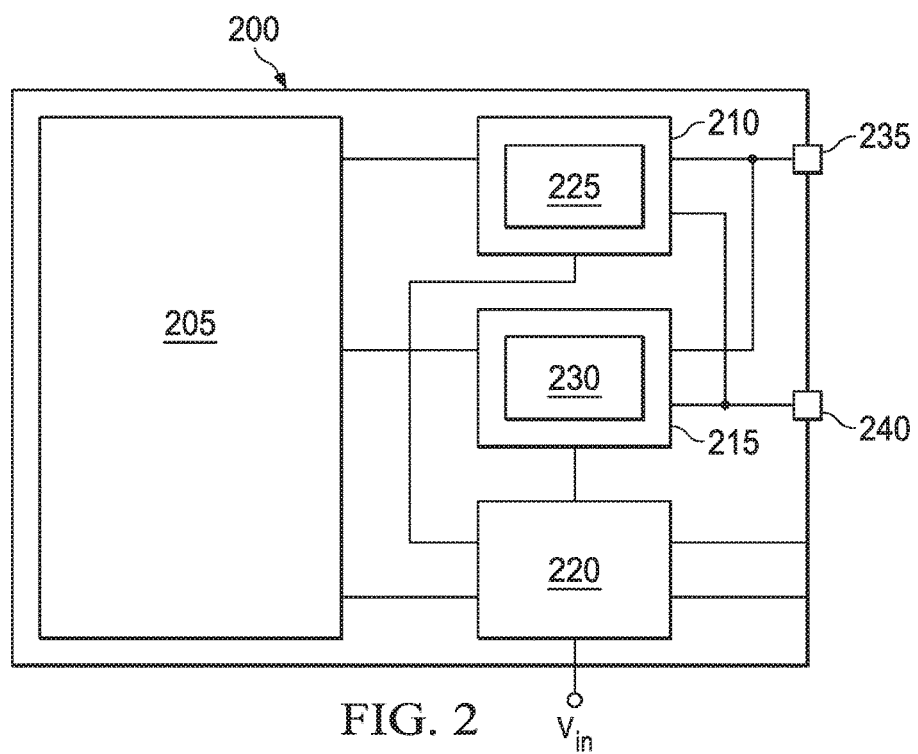
FIG. 2 shows a block diagram of an illustrative universal asynchronous receiver-transmitter (UART)

Referring now to FIG. 2, a block diagram of an illustrative UART 200 is shown. At least some aspects of the UART 200 may be implemented in, or as, the UART 105 and/or the UART 110 of FIG. 1, as discussed above. In at least one example, the UART 200 includes a processing element 205, a transmitter 210, and a receiver 215. In another example, the UART 200 further includes a regulator supply 220. In at least one example, the transmitter 210 includes a common-mode voltage protection circuit 225. In at least one example, the receiver 215 includes a common-mode voltage protection circuit 230. In at least one example, the transmitter 210 and the receiver 215 are each coupled to a positive pad 235 and a negative pad 240. In at least one example, the positive pad 235 and the negative pad 240 may each be configured to couple to a communication line for transmitting information to, or receiving information from, another electrical device (e.g., such as another UART 200).

In at least one example, the processing element 205 may be coupled to one or both of the transmitter 210 and/or the receiver 215. In at least some examples, the processing element 205 is configured to control operation of one or both of the transmitter 210 and/or the receiver 215. For example, the processing element 205 may control gate terminals of transistors (not shown) of one or both of the transmitter 210 and/or the receiver 215. In various examples, the processing element 205 may be a field programmable gate array (FPGA), a digital signal processor (DSP), a microcontroller, a microprocessor, a system on a chip (SOC), an application specific integrated circuit (ASIC), or any other suitable device including processing functionality. In various embodiments, the UART 200 may include other components such as a modem (not shown), a memory (not shown), or other forms of circuitry. In at least one example, the regulator supply 220 receives an input voltage (Vin) received by the UART 200 and regulates Vin for use by one or more components of the UART 200 (e.g., such as the processing element 205, transmitter 210, and/or receiver 215).

In at least one example, the common-mode voltage protection circuit 225 may protect the transmitter 210 by blocking current from flowing out of ground (not shown) into the positive pad 235 and the negative pad 240 and/or into the regulator supply 220 from the positive pad 235 and the negative pad 240. In at least one example, the common-mode voltage protection circuit 230 may protect the receiver 215 by sourcing current into, or sinking current from, the positive pad 235 and the negative pad 240 until the common mode input voltage present on the positive pad 235 and the negative pad 240 is approximately equal to a reference voltage (e.g., a mid-rail value) present in the receiver 215.

Figure 3:
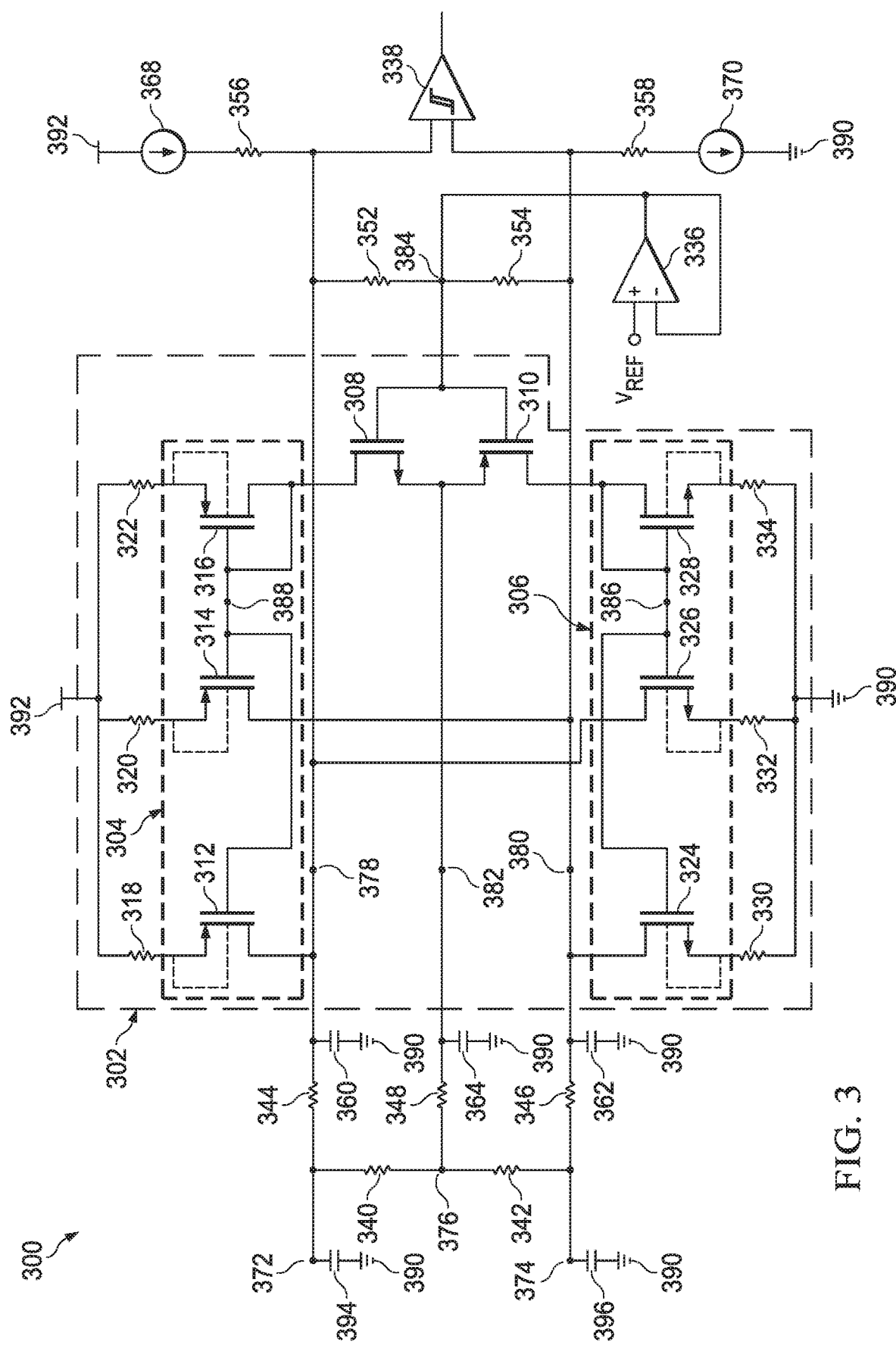
FIG. 3 shows a schematic diagram of an illustrative receiver.

Referring now to FIG. 3, a schematic diagram of an illustrative receiver 300 is shown. At least some aspects of the receiver 300 may be implemented in, or as, the receiver 215 of the UART 200 of FIG. 2, as discussed above. In at least one example, the receiver 300 includes a common-mode voltage protection circuit 302. In various other examples, the common-mode voltage protection circuit 302 is implemented separately from the receiver 300 and is configured to couple to the receiver 300 and/or any other electrical device or circuit to provide the functionality described herein. In yet other examples, the common-mode voltage protection circuit 302 is implemented in another electrical circuit that provides other functionality in addition to, or in place of, the receiver 300. In some examples, the common-mode voltage protection circuit 302 includes a first current mirror 304, a second current mirror 306, a first n-type metal oxide semiconductor field effect transistor (MOSFET) (NMOS) 308, and a first p-type MOSFET (PMOS) 310. In at least one example, the first current mirror 304 includes PMOS 312, PMOS 314, PMOS 316, and resistors 318, 320, and 322. In at least one example, the second current mirror 306 includes NMOS 324, NMOS 326, NMOS 328, and resistors 330, 332, and 334. In some examples, the receiver 300 further includes a buffer 336, a comparator 338, resistors 340, 342, 344, 346, 348, 352, 354, 356, and 358, capacitors 360, 362, and 364, and current sources 368 and 370. In at least one example, the common-mode voltage protection circuit 302 may further include the resistor 348, capacitor 364, and/or the buffer 336.

In at least one example, node 372 is a first input (e.g., a positive input) of the receiver 300 and node 374 is a second input (e.g., a negative input) of the receiver 300. Continuing the example, the resistor 340 is coupled between the node 372 and a node 376, the resistor 342 is coupled between the node 374 and the node 376, the resistor 344 is coupled between the node 372 and a node 378, the capacitor 360 is coupled between the node 378 and ground 390, the resistor 346 is coupled between the node 374 and a node 380, and the capacitor 362 is coupled between the node 380 and the ground 390. In at least one example, the resistor 344 and the capacitor 360 together form a first filter (e.g., low-pass filter) that may filter a signal received by the receiver 300 at the node 372. Similarly, the resistor 346 and the capacitor 362 may together form a second filter (e.g., low-pass filter) that may filter a signal received by the receiver 300 at the node 374. In various embodiments, the receiver 300 may include any number and form of resistive elements between nodes 372 and 378, as well as between nodes 374 and 380, and the resistors 344 and 346 are illustrated individually for the sake of simplicity. For example, a number of resistive elements between nodes 372 and 378 and/or between nodes 374 and 380 may be determined at least partially based on an amount of attenuation desired for a signal received at nodes 372 or 374 prior to the signal being received at nodes 378 or 380, respectively. In at least one example, to provide greater attenuation, a greater number of resistive elements (e.g., to total a greater amount of resistance) are included. Additionally, the receiver 300 may include any number of additional capacitors configured to form filters with the resistive elements located between nodes 372 and 378 and/or between nodes 374 and 380. For example, the receiver 300 may include multiple capacitors of varying values to progressively filter the signal in increments.

Continuing the example, the resistor 348 is coupled between the node 376 and a node 382 and the capacitor 364 is coupled between the node 382 and the ground 390. In at least one example, the resistor 348 and the capacitor 364 together form a third filter (e.g., low-pass filter) that may filter a signal received at the node 376. In various embodiments, the receiver 300 may include any number and form of resistive elements between nodes 376 and 382. For example, a number of resistive elements between nodes 376 and 382 may be determined at least partially based on an amount of attenuation desired for a signal received at node 376 (e.g., the common mode voltage of the signals present at nodes 372 and 374), prior to the signal being received at node 382. Additionally, the receiver 300 may include any number of additional capacitors configured to form filters with the resistive elements located between nodes 376 and 382. For example, the receiver 300 may include multiple capacitors of varying values to progressively filter the signal in increments. Further continuing the example, the resistor 352 is coupled between the node 378 and the node 384, and the resistor 354 is coupled between the node 380 and the node 384. A first input of the buffer 336 is configured to receive a reference voltage VREF, a second input of the buffer 336 is coupled to the node 384, and an output of the buffer 336 is coupled to the node 384. Still continuing the example, the current source 368 is coupled between the regulator supply 392 and the resistor 356, the resistor 356 is coupled between the current source 368 and the node 378, the resistor 358 is coupled between the node 380 and the current source 370, the current source 370 is coupled between the resistor 358 and the ground 390, a first input of the comparator 338 is coupled to the node 378, a second input of the comparator 338 is coupled to the node 380, and an output of the comparator 338 is an output of the receiver 300 (or alternatively, the output of the comparator 338 is further processed by other components (not shown) of the receiver 300). In at least one example, the current sources 368 and 370 level-shift signals present at nodes 378 and 380, respectively, to facilitate programmable voltage thresholds of the comparator 338. In at least one example, the receiver 300 further includes a capacitor 394 (e.g., an alternating-current (AC) coupling capacitor) coupled between the node 372 and the ground node 390 and a capacitor 396 (e.g., an AC coupling capacitor) coupled between the node 374 and the ground node 390. In at least one example, the capacitor 394 and the capacitor 396 are alternatively arranged to remove DC components of signals present at nodes 372 and 374, respectively, so that only AC components of the signals remain.

In at least one example, a source terminal of the NMOS 308 is coupled to the node 382, a drain terminal of the NMOS 308 is coupled to the node 388, and a gate terminal of the NMOS 308 is coupled to the node 384. In at least one example, a source terminal of the PMOS 310 is coupled to the node 382, a drain terminal of the PMOS 310 is coupled to the node 386, and a gate terminal of the PMOS 310 is coupled to the node 384. In at least one example, a source terminal of the PMOS 312 is coupled via the resistor 318 to a regulator supply 392, a drain terminal of the PMOS 312 is coupled to the node 378, and a gate terminal of the PMOS 312 is coupled to the node 388. In at least one example, a source terminal of the PMOS 314 is coupled via the resistor 320 to the regulator supply 392, a drain terminal of the PMOS 314 is coupled to the node 380, and a gate terminal of the PMOS 314 is coupled to the node 388. In at least one example, a source terminal of the PMOS 316 is coupled via the resistor 322 to the regulator supply 392, a drain terminal of the PMOS 316 is coupled to the node 388, and a gate terminal of the PMOS 316 is coupled to the node 388. In at least one example, a source terminal of the NMOS 324 is coupled via the resistor 330 to the ground 390, a drain terminal of the NMOS 324 is coupled to the node 380, and a gate terminal of the NMOS 324 is coupled to the node 386. In at least one example, a source terminal of the NMOS 326 is coupled via the resistor 332 to the ground 390, a drain terminal of the NMOS 326 is coupled to the node 378, and a gate terminal of the NMOS 326 is coupled to the node 386. In at least one example, a source terminal of the NMOS 328 is coupled via the resistor 334 to the ground 390, a drain terminal of the NMOS 328 is coupled to the node 386, and a gate terminal of the NMOS 328 is coupled to the node 386.

In at least one example of operation of the receiver 300, signals are received at nodes 372 and 374. The signals may include any one or more of a data component (e.g., a differential data signal), a noise component, and/or a common-mode voltage component. For example, the signals may include a common-mode voltage induced by a BCI test, as described above. In at least some examples, the common-mode voltage has an amplitude that is greater than an allowable tolerance of one or more components of the receiver 300 (e.g., such as the comparator 338) and may degrade performance of the receiver and/or damage at least some of the one or more components if not mitigated. In at least one example, the common-mode voltage received at nodes 372 and 374 may have approximately a same amplitude and may be passed to node 376 with minimal attenuation. The common-mode voltage at node 376 may be further passed to the node 382. In at least some examples, the common-mode voltage may be attenuated between nodes 376 and 382 by the resistor 348. Attenuating the common-mode voltage between nodes 376 and 382, in some examples, reduces a value of the common-mode voltage prior to receipt at node 382 such that the NMOS 308 and PMOS 310 may have a lower voltage rating (e.g., maximum sustainable voltage on a terminal) than if the resistor 348 is omitted.

Continuing the example of operation, the buffer 336 is configured to receive a reference voltage at a first input. In at least some examples, the reference voltage is set by the receiver 300 as, for example, a mid-rail voltage. For example, the first input of the buffer 336 may be coupled to a midpoint of a voltage divider configured to drop half of a supply voltage of the receiver 300 across a first resistor and drop half of the supply voltage of the receiver 300 across a second resistor. The output of the buffer 336 being tied to the second input of the buffer 336, in some examples, provides that the second input will be held at the output value and the buffer 336 will output VREF to node 384. In at least one example, the buffer 336 is a unity-gain buffer.

When the common-mode voltage present at node 382 is significantly greater than VREF, the voltage differential between the source terminal of the PMOS 310 and the gate terminal of the PMOS 310 may be great enough to cause the PMOS 310 to begin conducting between its source and drain terminals. In at least one example, when the PMOS 310 begins conducting between its source and drain terminals, the second current mirror 306 is turned on such that a current flowing from node 382 through the PMOS 310 and to the NMOS 328 is mirrored by the NMOS 324 and the NMOS 326. For example, to mirror the current flowing through the NMOS 328, the NMOS 324 draws (e.g., sinks) current from the node 380 and the NMOS 326 draws current from the node 378. Drawing current from the nodes 378 and 380, in some examples, reduces the common-mode voltage present at these nodes by pulling the common-mode voltage present at nodes 378 and 380 toward VREF. When the common-mode voltage present at node 382 is not significantly greater than VREF, the voltage differential between the source terminal of the PMOS 310 and the gate terminal of the PMOS 310 may be insufficient to cause the PMOS 310 to conduct between its source and drain terminals. In at least one example, when the PMOS 310 does not conduct between its source and drain terminals, the second current mirror 306 is turned off such that the second current mirror 306 does not draw current from the nodes 378 or 380.

When the common-mode voltage present at node 382 is significantly less (e.g., such as a negative voltage) than VREF, the voltage differential between the source terminal of the NMOS 308 and the gate terminal of the NMOS 308 may be great enough to cause the NMOS 308 to begin conducting between its source and drain terminals. In at least one example, when the NMOS 308 begins conducting between its source and drain terminals, the first current mirror 304 is turned on such that a current flowing from the regulator supply 392 through the PMOS 316 to the NMOS 308 and into the node 382 is mirrored by the PMOS 312 and the PMOS 314. For example, to mirror the current flowing through the PMOS 316, the PMOS 312 and the PMOS 314 draw current from the regulator supply 392 and provide the current to the nodes 378 and 380, respectively. Providing the current to the nodes 378 and 380, in some examples, increases the common-mode voltage present at these nodes (e.g., makes a negative common-mode voltage less nega-tive) by pulling the common-mode voltage present at nodes 378 and 380 toward VREF. When the common-mode voltage present at node 382 is not significantly less than VREF, the voltage differential between the source terminal of the NMOS 308 and the gate terminal of the NMOS 308 may be insufficient to cause the NMOS 308 to conduct between its source and drain terminals. In at least one example, when the NMOS 308 does not conduct between its source and drain terminals, the first current mirror 304 is turned off such that the first current mirror 304 does not draw current from the regulator supply 392 to provide to the nodes 378 and 380.

In this way, in at least one example, the common-mode voltage protection circuit 302 controls the common-mode voltage of the signals present at nodes 378 and 380 of the receiver 300 based at least partially on VREF such that the common-mode voltage present at nodes 378 and 380 is approximately equal to VREF. For example, when the common-mode voltage present at node 376 is +/−20 V, the common-mode voltage protection circuit 302 may control the common-mode voltage present at nodes 378 and 380 to be approximately +/−250 millivolts (mV) of VREF. In some examples, at least a portion of a voltage difference between the common-mode voltage present at nodes 378 and 380 and VREF may be attributable to threshold of the NMOS 308 and/or the PMOS 310 that specify a voltage differential between source and gate terminals sufficient to cause the NMOS 308 and/or the PMOS 310 to begin conducting.

Figure 4:
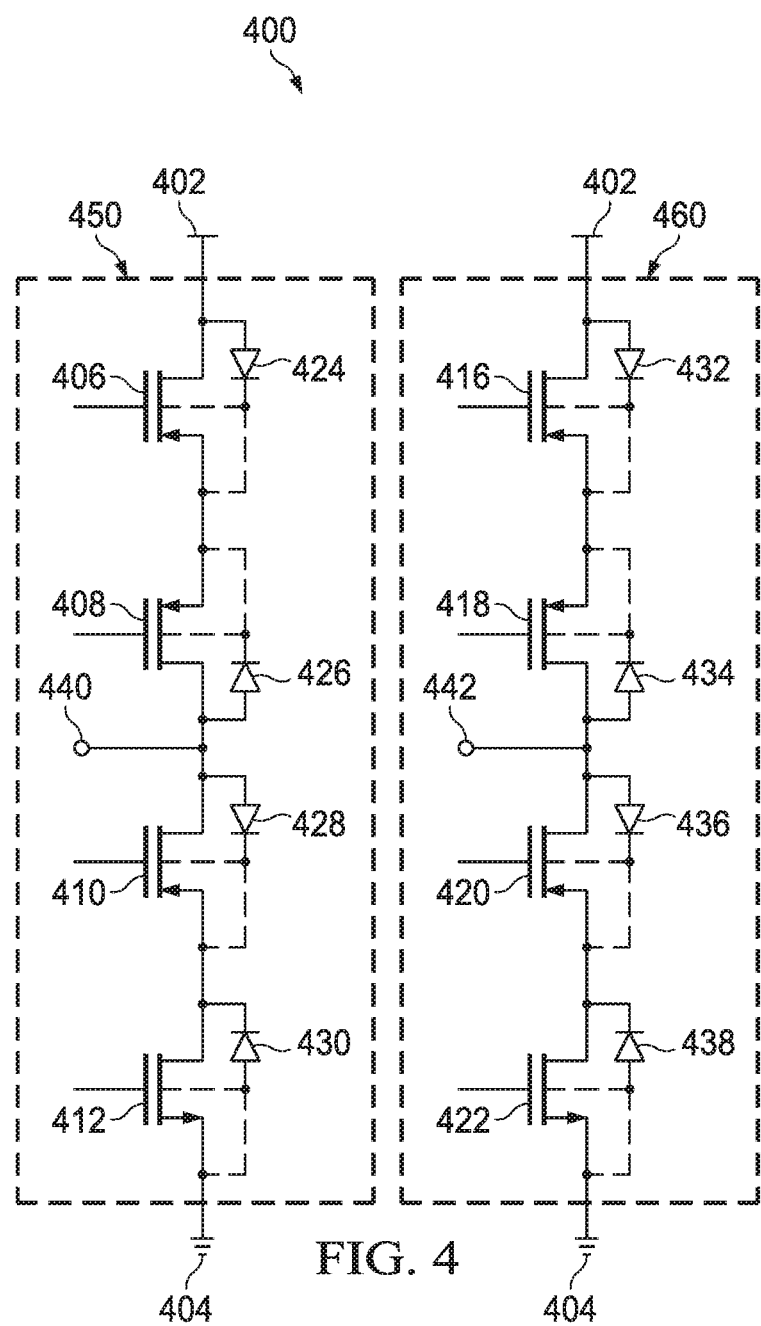
FIG. 4 shows a schematic diagram of an illustrative transmitter.

Referring now to FIG. 4, a schematic diagram of an illustrative transmitter 400 is shown. At least some aspects of the transmitter 400 may be implemented in, or as, the transmitter 210 of the UART 200 of FIG. 2, as discussed above. In at least one example, the transmitter 400 is arranged such that the transmitter 400 provides both transmission functionality and common-mode voltage protection via a same circuit without providing a separate common-mode voltage protection circuit.

In at least one example, the transmitter 400 includes PMOS 406, 408, 410, 416, 418, and 420, as well as NMOS 412 and 422. In at least one example, the transmitter 400 may include two portions—a first portion 450 configured to transmit via a positive terminal 440 and a second portion 460 configured to transmit via a negative terminal 442. The terminal 440 may be shared with the node 372 and the terminal 442 may be shared with the node 374 when the transmitter 400 is implemented in a transceiver (e.g., such as a full-duplex UART) with the receiver 300, as discussed above with reference to FIG. 3. In at least one example, the first portion 450 includes the PMOS 406, PMOS 408, PMOS 410, and NMOS 412 and the second portion 460 includes the PMOS 416, PMOS 418, PMOS 420, and NMOS 422. In some examples, the transmitter 400 further includes parasitic diodes 424, 426, 428, 430, 432, 434, 436, and 438 (referred to collectively herein as 424-438). In at least some examples, the parasitic diodes 424-438 couple between respective drain terminals and bulk connections of the components of the transmitter 400. In an example, a parasitic diode may be an inherent portion of a device (e.g., a transistor) that under certain conditions may operate in an unintended manner that may be undesirable and/or inhibit proper or efficient operation of the device. For example, the parasitic diodes are inherent to the components of the transmitter 400 and are not included in the transmitter 400 as separate, physical components.

In at least one example, a drain terminal of the PMOS 406 is coupled to a regulator supply 402, a source terminal of the PMOS 406 is coupled to a source terminal of the PMOS 408, and a gate terminal of the PMOS 406 is coupled to a controller (not shown). In at least one example, a drain terminal of the PMOS 408 is coupled to the terminal 440, the source terminal of the PMOS 408 is coupled to the source terminal of the PMOS 406, and a gate terminal of the PMOS 408 is coupled to the controller. In at least one example, a drain terminal of the PMOS 410 is coupled to the terminal 440, a source terminal of the PMOS 410 is coupled to a drain terminal of the NMOS 412, and a gate terminal of the PMOS 410 is coupled to the controller. In at least one example, a drain terminal of the NMOS 412 is coupled to the source terminal of the PMOS 410, a source terminal of the NMOS 412 is coupled to a ground 404, and a gate terminal of the NMOS 412 is coupled to the controller. Additionally, each of the PMOS 406, PMOS 408, PMOS 410, and NMOS 412 may include a coupling between respective source terminals and bulk connections. In at least one example, the PMOS 416, PMOS 418, PMOS 420, NMOS 422, and terminal 442 are coupled in a manner substantially similar to the PMOS 406, PMOS 408, PMOS 410, NMOS 412, and terminal 440, details of which are illustrated in FIG. 4 and not repeated at length herein.

In at least one example of operation of the transmitter 400, the PMOS 406 receives an enable signal at its gate terminal that is sufficiently less than a value present at its source terminal (e.g., approximately a value of the regulator supply 402) to cause the PMOS 406 to turn on and begin conducting between its source and drain terminals. Similarly, the PMOS 408 receives a data signal at its gate terminal that is sufficiently less than a value present at its source terminal (e.g., approximately the value of the regulator supply 402) to cause the PMOS 408 to turn on and begin conducting between its source and drain terminals, thereby providing approximately the value of the regulator voltage (e.g., minus voltage drops across the PMOS 406 and 408) at the terminal 440. While the PMOS 406 and 408 are conducting, the PMOS 410 and the NMOS 412 may receive signals at their respective gate terminals that are insufficient to cause the PMOS 410 or the NMOS 412 to begin conducting.

In another example of operation of the transmitter 400, the PMOS 410 receives an enable signal at its gate terminal that is sufficiently less than a value present at its source terminal to cause the PMOS 410 to turn on and begin conducting between its source and drain terminals. In at least one example, the source terminal of the PMOS 410 may be floating (e.g., not directly coupled to the regulator supply 402 or the ground 404 when the NMOS 412 is not conducting). In such an example, the gate terminal of the PMOS 410 may require a negative voltage to create a sufficient voltage difference with the source terminal of the PMOS 410 to cause the PMOS 410 to begin conducting between its drain and source terminals. The negative voltage may be provided to the gate terminal of the PMOS 410 by an suitable component including, for example, the controller, a charge pump (not shown) a second regulator supply (not shown) configured to provide negative voltages, or any other device capable of providing a negative voltage. Similarly, the NMOS 412 receives a data signal at its gate terminal that is sufficiently greater than a value present at its source terminal (e.g., the value of ground 404) to cause the NMOS 412 to turn on and begin conducting between its source and drain terminals, thereby coupling the terminal 440 to the ground 404. While the PMOS 410 and NMOS 412 are conducting, the PMOS 406 and 408 may receive signals at their respective gate terminals that are insufficient to cause the PMOS 406 and 408 to begin conducting.

When the transmitter 400 is implemented in a transceiver and shares the terminal 440 with a receiver (not shown) such that the terminal 440 is both an output of the transmitter 400 or an input of the receiver depending on a mode of operation of the transceiver, the transmitter 400 should not affect the receiver when the transceiver is operating in a receiver mode. However, in certain circumstances, such as under BCI test as described herein when the transceiver is operating in a receiver mode, unpredictable or undesirable results in the transmitter (which may be disabled while the transceiver is operating in the receiver mode) may occur which may affect the receiver. For example, a voltage induced by the BCI test may cause current to flow out of ground 404 and into the terminal 440 and/or from the terminal 440 into the regulator supply 402. To mitigate against these unpredictable or undesirable results, the transmitter 400 may be configured to block current flow out of ground 404 and/or into the regulator supply 402.

In at least one example, when a voltage present at terminal 440 is large (e.g., a common-mode voltage induced by the BCI test), a path may form between the terminal 440 and the parasitic diode 424 via the parasitic diode 426 and the bulk connections of the PMOS 408 and PMOS 406. However, in at least one example, the orientation of the PMOS 406 orients the parasitic diode 424 as a blocking diode that blocks conduction of current from the bulk connection of the PMOS 406 to the regulator supply 402. Similarly, when the voltage present at terminal 440 is largely negative, a path may form between the ground 404 and the parasitic diode 428 via the parasitic diode 430 and the bulk connections of NMOS 412 and PMOS 410. However, in at least one example, the orientation of the PMOS 410 orients the parasitic diode 428 as a blocking diode that blocks conduction of current from the bulk connection of the PMOS 410 to terminal 440.

In this way, in at least one example, the transmitter 400 blocks current from flowing out of ground 404 and/or into the regulator supply 402 when the transmitter 400 is disabled to prevent unpredictable and/or undesirable effects of the transmitter 400 on another device (e.g., a receiver, such as the receiver 300 of FIG. 3) sharing the terminal 440 with the transmitter 400.

In at least one example, the PMOS 416, PMOS 418, PMOS 420, NMOS 422, and terminal 442 operate in a manner substantially similar to the PMOS 406, PMOS 408, PMOS 410, NMOS 412, and terminal 440, details of which are not repeated at length herein.

Figure 5:
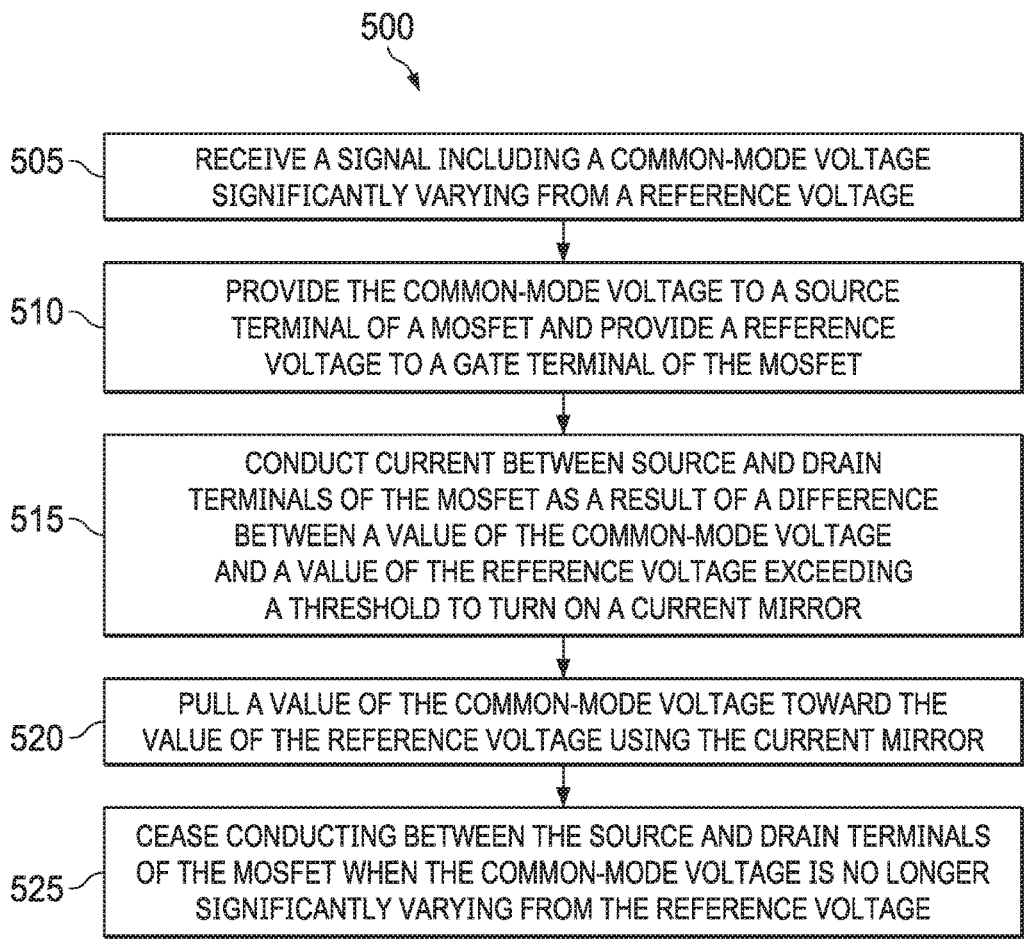
FIG. 5 is a flowchart of an illustrative method of common-mode voltage protection in a receiver.

Referring now to FIG. 5, a flowchart of an illustrative method 500 of common-mode voltage protection in a receiver is shown. At least some aspects of the method 500 are implemented, for example, by the receiver 300, discussed above with reference to FIG. 3. In at least one example, the method 500 is implemented when a receiver receives a signal including a common-mode voltage that exceeds a tolerance of one or more components of the receiver, for example, as discussed above.

At operation 505, the receiver receives signals with a common-mode voltage significantly varying from a reference voltage of the receiver. In at least one example, the reference voltage is a mid-rail voltage of the receiver. In at least one example, the common-mode voltage of the signals significantly varies from the reference voltage when the common-mode voltage has a value sufficient to cause a MOSFET to conduct between its drain and source terminals when the reference voltage is received at a gate terminal of the MOSFET and the common-mode voltage (with or without attenuation) is received at the source terminal of the MOSFET. In at least one example, the common-mode voltage is induced on a communication line during a BCI test to quantify an immunity of the receiver to RF interference.

At operation 510, the common-mode voltage is provided to a source terminal of a MOSFET of the receiver and the reference voltage is provided to a gate terminal of the MOSFET. In at least one example, the MOSFET of the receiver is the NMOS 308 and/or the PMOS 310 of the receiver 300, discussed above with respect to FIG. 3.

At operation 515, the MOSFET conducts current between its source and drain terminals as a result of a difference between a value of the common-mode voltage and a value of the reference voltage exceeding a threshold. In at least one example, when the MOSFET conducts current between its source and drain terminals, a current mirror coupled to the MOSFET is turned on.

At operation 520, the current mirror pulls a value of the common-mode voltage toward a value of the reference voltage. For example, when the common-mode voltage is significantly greater than the reference voltage, the current mirror sinks current from a node at which the common-mode voltage is present to pull the common-mode voltage downward toward the reference voltage. Similarly, when the common-mode voltage is significantly less than the reference voltage (e.g., a negative voltage), the current mirror sources current to a node at which the common-mode voltage is present to pull the common-mode voltage upward toward the reference voltage.

At operation 525, the MOSFET ceases conducting between its source and drain terminals when the common-mode voltage is no longer significantly varying from the reference voltage. For example, the MOSFET may cease conducting between its source and drain terminals when the difference between the value of the common-mode voltage and the value of the reference voltage does not exceed the threshold. In at least one example, when the MOSFET does not conduct current between its source and drain terminals, the current mirror coupled to the MOSFET is turned off.

Figure 6:
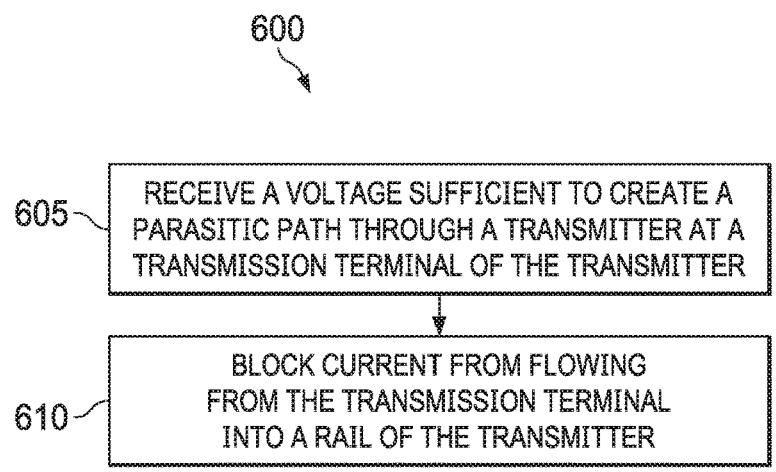
FIG. 6 is a flowchart of an illustrative method of common-mode voltage protection in a transmitter.

Referring now to FIG. 6, a flowchart of an illustrative method 600 of common-mode voltage protection in a transmitter is shown. At least some aspects of the method 600 are implemented, for example, by the transmitter 400, discussed above with reference to FIG. 4. In at least one example, the method 600 is implemented when a voltage sufficient to create a parasitic path through the transmitter is received at a transmission terminal of a transmitter. In at least one example, the transmitter is a disabled transmitter in a transceiver in which a receiver is currently operating.

At operation 605, the transmitter receives a voltage sufficient to create a parasitic path through the transmitter at a transmission terminal of the transmitter. In at least one example, the voltage is a common-mode voltage induced on a communication line coupled to the transmission terminal of the transmitter during a BCI test to quantify the immunity of a receiver coupled to the transmitter. In at least one example, the transmitter is a component of a transceiver also including a receiver and transmission terminal of the transmitter is coupled to the receiver as a receiving terminal of the receiver.

At operation 610, the transmitter blocks current from flowing from the transmission terminal into a rail of the transmitter. The rail of the transmitter is, for example, a regulated voltage supply coupled to the transmitter and/or a ground connection coupled to the transmitter. In at least one example, when the voltage received at the transmission terminal is a positive sufficient to create a parasitic path through the transmitter, parasitic diodes, in conjunction with bulk connections, of one or more transistors of the transmitter may attempt to create unintended and/or undesirable parasitic paths through the transmitter. These unintended and/or undesirable parasitic paths may inhibit proper operation of the transmitter and/or the receiver when the transmitter is implemented in a transceiver, as discussed above. When the parasitic path is created through the transmitter, current may flow in a manner that is unintended, for example, outside of the switch-based control of the transistors of the transmitter.

In at least one example, the transmitter blocks the current from flowing from the transmission terminal into the rail of the transmitter based on an orientation of components of the transmitter. For example, one or more transistors of the transmitter may be oriented such that parasitic diodes of the transistors operate as blocking diodes to prevent a parasitic path in the transmitter from being completed to a rail of the transmitter. In at least one example, the blocking is performed without the addition of special-purpose blocking circuitry (e.g., such as common-mode chokes) to the transmitter.

While the operations of the methods 500 and 600 have been discussed and labeled with numerical reference, the methods 500 and 600 may each include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. A device that is "configured to" perform a task or function may be configured (e.g., programmed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. While certain transistors of the present disclosure have been described as being p-type (PMOS) or n-type (NMOS), a design implemented using PMOS transistors may also be implemented using NMOS transistors and vice versa, without departing from the scope of the present disclosure. Additionally, while certain transistors of the present disclosure have been described as being MOSFETs, a design implemented using MOSFETs may also be implemented using other transistor technologies without departing from the scope of the present disclosure. Unless otherwise stated, "about", "approximately", or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A voltage protection circuit, comprising:
a first metal oxide semiconductor field effect transistor (MOSFET) having a gate terminal coupled to a first node, a source terminal coupled to a second node, and a drain terminal coupled to a third node;
a second MOSFET having a gate terminal coupled to the first node, a source terminal coupled to the second node, and a drain terminal coupled to a fourth node;
a first current mirror coupled to the third node and configured to couple to a fifth node, a sixth node, and a regulator supply; and
a second current mirror coupled to the fourth node, and configured to couple to the fifth node, the sixth node, and a ground node.

2. The voltage protection circuit of claim 1, wherein the first MOSFET is a n-type MOSFET and the second MOSFET is a p-type MOSFET.

3. The voltage protection circuit of claim 1, wherein the first current mirror comprises:
a first p-type MOSFET (PMOS) having a gate terminal coupled to the third node, a source terminal configured to couple to the regulator supply, and a drain terminal coupled to the third node;
a second PMOS having a gate terminal coupled to the third node, a source terminal configured to couple to the regulator supply, and a drain terminal configured to couple to the sixth node; and
a third PMOS having a gate terminal coupled to the third node, a source terminal configured to couple to the regulator supply, and a drain terminal configured to couple to the fifth node.

4. The voltage protection circuit of claim 1, wherein the second current mirror comprises:
a first n-type MOSFET (NMOS) having a gate terminal coupled to the fourth node, a source terminal configured to couple to the ground node, and a drain terminal coupled to the fourth node;
a second NMOS having a gate terminal coupled to the fourth node, a source terminal configured to couple to the ground node, and a drain terminal configured to couple to the fifth node; and
a third NMOS having a gate terminal coupled to the fourth node, a source terminal configured to couple to the ground node, and a drain terminal configured to couple to the sixth node.

5. The voltage protection circuit of claim 4, wherein the first current mirror is configured to couple to the regulator supply via a first plurality of resistors having at least one resistor positioned between the source terminals of each of the first PMOS, second PMOS, and third PMOS and the regulator supply, and wherein the second current mirror is configured to couple to the ground node via a second plurality of resistors having at least one resistor positioned between the source terminals of each of the first NMOS, second NMOS, and third NMOS and the ground node.

6. The voltage protection circuit of claim 1, further comprising a resistor coupled between the third node and an input node, wherein a voltage present at the input node equals a voltage present at the fifth and sixth nodes.

7. The voltage protection circuit of claim 1, further comprising a buffer having a first input configured to receive a reference voltage, an output coupled to the first node, and a second input coupled to the output.

8. The voltage protection circuit of claim 1, wherein when a voltage present at the second node is sufficient with respect to a voltage present at the first node to cause at least one of the first MOSFET or the second MOSFET to turn on, at least one of the first current mirror or the second current mirror pulls a voltage present on the fifth node and the sixth node toward the voltage present at the first node.

9. A transceiver, comprising:
a transmitter coupled to a first node and a second node; and
a receiver coupled to the first node and the second node and comprising a voltage protection circuit that comprises:
a first metal oxide semiconductor field effect transistor (MOSFET) having a gate terminal coupled to a third node, a source terminal coupled to a fourth node, and a drain terminal coupled to a fifth node;
a second MOSFET having a gate terminal coupled to the third node, a source terminal coupled to the fourth node, and a drain terminal coupled to a sixth node;
a first current mirror coupled to the fifth node, a seventh node, an eighth node, and configured to couple to a regulator supply; and
a second current mirror coupled to the sixth node, the seventh node, the eighth node, and configured to couple to a ground node.

10. The transceiver of claim 9, wherein the first current mirror comprises:
a third MOSFET having a gate terminal coupled to the fifth node, a source terminal configured to couple to the regulator supply, and a drain terminal coupled to the fifth node;
a fourth MOSFET having a gate terminal coupled to the fifth node, a source terminal configured to couple to the regulator supply, and a drain terminal coupled to the eighth node; and
a fifth MOSFET having a gate terminal coupled to the fifth node, a source terminal configured to couple to the regulator supply, and a drain terminal coupled to the seventh node.

11. The transceiver of claim 9, wherein the second current mirror comprises:
a sixth MOSFET having a gate terminal coupled to the sixth node, a source terminal configured to couple to the ground node, and a drain terminal coupled to the sixth node;
a seventh MOSFET having a gate terminal coupled to the sixth node, a source terminal configured to couple to the ground node, and a drain terminal coupled to the seventh node; and
an eighth MOSFET having a gate terminal coupled to the sixth node, a source terminal configured to couple to the ground node, and a drain terminal coupled to the eighth node.

12. The transceiver of claim 9, wherein the transmitter comprises:
a first p-type MOSFET (PMOS) having a source terminal, a drain terminal configured to couple to the regulator supply, and a first parasitic diode having an anode coupled to the drain terminal of the first PMOS;
a second PMOS having a source terminal coupled to the source terminal of the first PMOS and a drain terminal coupled to the first node;
a third PMOS having a drain terminal coupled to the first node, a source terminal, and a second parasitic diode having an anode coupled to the drain terminal of the third PMOS; and
a first n-type MOSFET having a drain terminal coupled to the source terminal of the third PMOS and a source terminal configured to couple to the ground node.

13. The transceiver of claim 12, wherein the transmitter further comprises:
a fourth PMOS having a source terminal, a drain terminal configured to couple to the regulator supply, and a third parasitic diode having an anode coupled to the drain terminal of the fourth PMOS;
a fifth PMOS having a source terminal coupled to the source terminal of the fourth PMOS and a drain terminal coupled to the second node;
a sixth PMOS having a drain terminal coupled to the second node, a source terminal, and a fourth parasitic diode having an anode coupled to the drain terminal of the sixth PMOS; and
a seventh n-type MOSFET having a drain terminal coupled to the source terminal of the sixth PMOS and a source terminal configured to couple to the ground node.

14. The transceiver of claim 9, further comprising a buffer having a first input configured to receive a reference voltage, an output coupled to the third node, and a second input coupled to the output.

15. The transceiver of claim 9, further comprising a comparator having a first input coupled to the seventh node and a second input coupled to the eighth node.

16. The transceiver of claim 9, further comprising the regulator supply.

17. A method of voltage protection, comprising
receiving a signal including a common-mode voltage significantly varying from a reference voltage;
providing the common-mode voltage to a source terminal of a metal oxide semiconductor field effect transistor (MOSFET) and providing the reference voltage to a gate terminal of the MOSFET;
conducting current between the source terminal and a drain terminal of the MOSFET to turn on a current mirror when a difference between a value of the common-mode voltage and a value of the reference voltage exceeds a threshold;
pulling the value of the common-mode voltage toward the value of the reference voltage using the current mirror; and
ceasing conducting current between the source terminal and a drain terminal of the MOSFET when the common-mode voltage no longer significantly varies from the reference voltage.

18. The method of claim 17, wherein to pull the value of the common-mode voltage toward the value of the reference voltage the current mirror sinks current from a node at which the common-mode voltage is present.

19. The method of claim 17, wherein to pull the value of the common-mode voltage toward the value of the reference voltage the current mirror source current to a node at which the common-mode voltage is present.

20. The method of claim 17, wherein the threshold is a source to drain voltage differential threshold of the MOSFET, and wherein the common-mode voltage varies from the reference voltage when the common-mode voltage is greater than the reference voltage plus the source to drain voltage differential threshold.

* * * * *